(12) United States Patent
Sethi et al.

(10) Patent No.: US 8,880,294 B2
(45) Date of Patent: Nov. 4, 2014

(54) PROACTIVE ELECTRONIC STABILITY CONTROL SYSTEM

(75) Inventors: Lalit Kumar Sethi, Troy, MI (US); Ermal Gjoni, Sterling Heights, MI (US); Hector Hernandaz, Pontiac, MI (US); Roy Gammouh, Auburn Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 276 days.

(21) Appl. No.: 13/252,365

(22) Filed: Oct. 4, 2011

(65) Prior Publication Data

US 2013/0085639 A1    Apr. 4, 2013

(51) Int. Cl.
  *B62D 6/00*    (2006.01)
  *G06F 19/00*   (2011.01)
  *B60T 8/1755*  (2006.01)

(52) U.S. Cl.
  CPC ....... *B60T 8/17555* (2013.01); *B60T 2201/122* (2013.01); *B60T 2210/36* (2013.01); *B60T 2260/02* (2013.01)
  USPC .................................................. 701/41; 701/1

(58) Field of Classification Search
  None
  See application file for complete search history.

(56) References Cited

U.S. PATENT DOCUMENTS

| | | | | |
|---|---|---|---|---|
| 2003/0078700 A1* | 4/2003 | Chee | ................................. | 701/1 |
| 2004/0176889 A1* | 9/2004 | Capito | ............................. | 701/37 |
| 2005/0206236 A1 | 9/2005 | Mori et al. | | |
| 2006/0259225 A1* | 11/2006 | Ono et al. | ........................ | 701/82 |
| 2007/0088477 A1* | 4/2007 | Brewer et al. | ................... | 701/41 |
| 2007/0260383 A1* | 11/2007 | Sundaram et al. | .............. | 701/70 |
| 2008/0061625 A1* | 3/2008 | Schmitt et al. | ................ | 303/146 |
| 2008/0243335 A1* | 10/2008 | Rao et al. | ......................... | 701/38 |
| 2009/0249128 A1* | 10/2009 | Heckman et al. | ................ | 714/47 |
| 2010/0262326 A1* | 10/2010 | Buszek et al. | ................... | 701/29 |
| 2011/0313656 A1* | 12/2011 | Mignen et al. | ................ | 701/207 |
| 2012/0095659 A1* | 4/2012 | Rodrigues et al. | .............. | 701/69 |
| 2012/0173111 A1* | 7/2012 | Nagaya et al. | ................... | 701/72 |
| 2012/0176234 A1* | 7/2012 | Taneyhill et al. | ............. | 340/453 |
| 2012/0245814 A1* | 9/2012 | Buszek et al. | ................... | 701/69 |

FOREIGN PATENT DOCUMENTS

| | | |
|---|---|---|
| WO | 0236401 A1 | 5/2002 |
| WO | 03064226 A1 | 8/2003 |
| WO | 2004007059 A2 | 5/2004 |
| WO | 2004041613 A1 | 5/2004 |

OTHER PUBLICATIONS

Search Report and the Written Opinion of the International Searching Authority, PCT/US2012/058409, Jan. 15, 2013.

* cited by examiner

*Primary Examiner* — Mussa A Shaawat

(57) ABSTRACT

A method of controlling stability of a vehicle comprises monitoring vehicle information with an electronic control unit. An approaching unstable driving condition is detected from the vehicle information with an electronic control unit. A signal is sent from the electronic control unit to at least one vehicle system to apply at least one proactive vehicle stability control action prior to the occurrence of the unstable driving condition.

15 Claims, 2 Drawing Sheets

PROACTIVE ELECTRONIC STABILITY CONTROL SYSTEM

TECHNICAL FIELD

The present disclosure relates to automotive vehicles, and more particularly to stability control systems for automotive vehicles.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Automotive vehicle systems may include electronic stability control (ESC) systems to assist the driver in maintaining control of the vehicle during various vehicle functions, such as steering and braking, and under varying vehicle driving conditions. These control systems may take into account many factors including vehicle speed, vehicle acceleration, steering angle, wheel slip, weather conditions, etc. When an ESC system senses an unstable driving condition is occurring a signal is sent to one of the vehicle systems, such as the steering or braking system, to provide a corrective action. Corrective actions may include such actions as adjusting brake pressure, steering angle, vehicle speed, etc.

SUMMARY

A method of controlling stability of a vehicle comprises monitoring vehicle information with an electronic control unit. An approaching unstable driving condition is detected from the vehicle information with an electronic control unit prior to the occurrence of the unstable driving condition. At least one output signal of a first signal series is sent from the electronic control unit to at least one vehicle system to apply at least one proactive vehicle stability control action prior to the occurrence of the unstable driving condition.

A method of controlling stability of a vehicle comprises monitoring vehicle information with an electronic control unit. An approaching unstable driving condition is detected from the vehicle information with an electronic control unit prior to the occurrence of the unstable driving condition. A signal is sent to at least one vehicle system to apply at least one proactive vehicle stability control action prior to the occurrence of the unstable driving condition.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
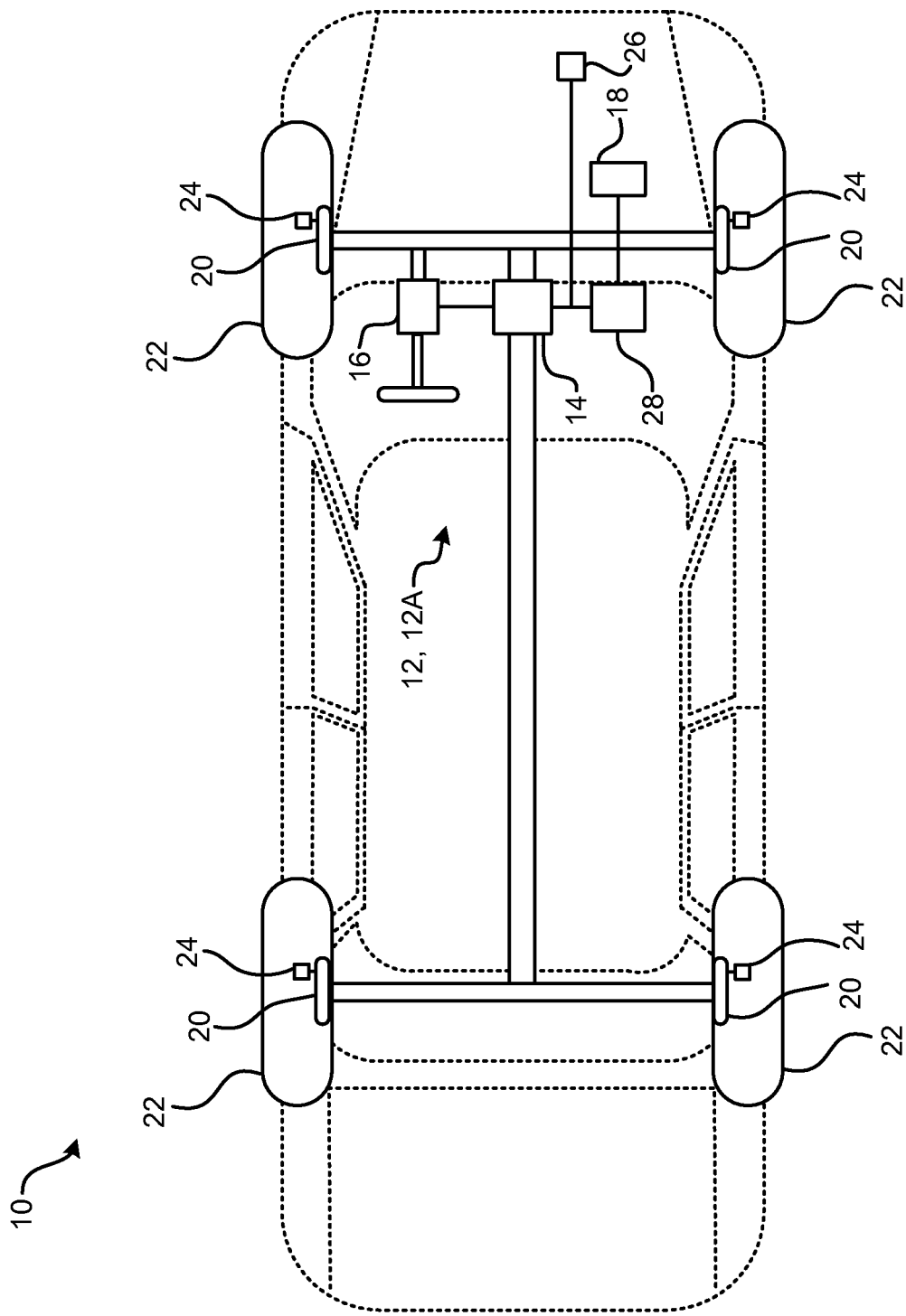
FIG. 1 is a schematic top view of a vehicle having a proactive electronic stability control system.

The following description is merely exemplary in nature and is in no way intended to limit the disclosure, its application, or uses. For purposes of clarity, the same reference numbers will be used in the drawings to identify similar elements. FIG. 1 is a schematic illustration of a vehicle 10 having a proactive electronic stability control (PESC) system 12. The PESC system 12 is preferably part of an electronic stability control (ESC) system 12A for the vehicle 10 and may be utilize the same components, as described below.

The PESC 12 may be connected to other systems for the vehicle 10 including a brake system 14, a steering system 16, and a GPS 18. Other systems, not shown, that provide information that may be utilized by the PESC 12 may also be connected. Likewise, other systems, not shown, that may be used to control the stability of the vehicle 10 may also be connected to receive signals from the PESC 12.

The brake system 14 includes brakes 20 at each of the wheels 22 for the vehicle 10. Additionally, brake sensors 24, such as speed sensors, may also be located at each of the wheels 22. Various other sensors including weather sensors, such as a temperature sensor 26, may also be connected to the PESC system 12. The PESC system 12 includes a module 28 having an electronic control unit (ECU). The PESC module 28 receives input from the various vehicle systems and sensors mentioned above. The PESC module 28 receives input data from weather sensors, such as temperature sensor 26, located on the vehicle 10. The vehicle sensors 24, 26 providing input data to the PESC module 28 may be part of already existing systems in the vehicle 10, such as the electronic brake system 14 or the steering system 16. The GPS 18 and associated sensors also provide data to the PESC module 28. The data from the GPS 18 also includes electronic road map data.

Figure 2:
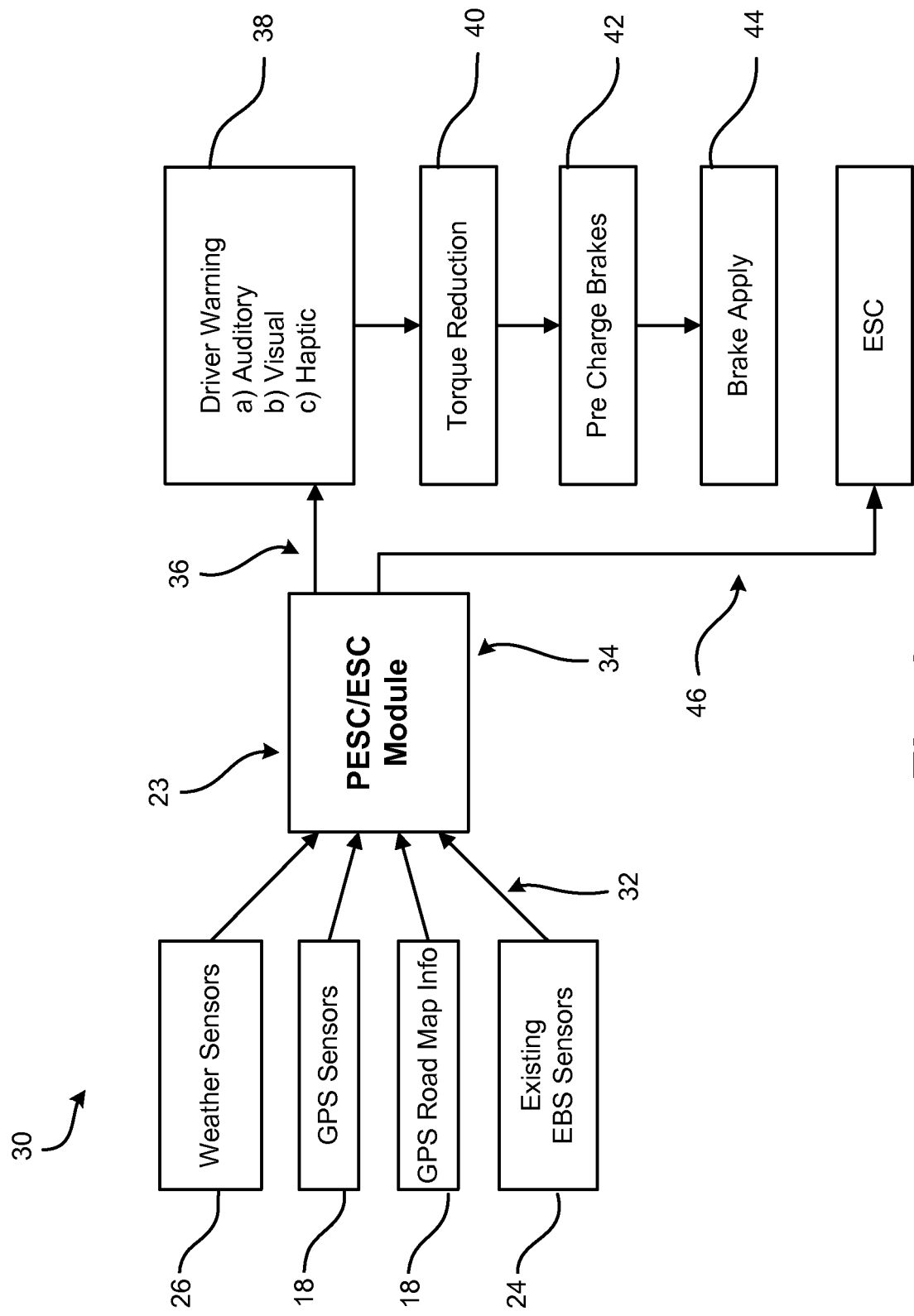
FIG. 2 is a schematic diagram of an exemplary proactive electronic stability control system for the vehicle of FIG. 1.

FIG. 2 illustrates a method 30 for operating the PESC system 12. With reference to FIGS. 1 and 2 the method for operating the PESC system 12 is described below. Data is sent from various systems and sensors for the vehicle 10 to the PESC module 28, step 32. The PESC module 28 monitors and processes the various data to determine if an unstable driving condition is likely to occur, step 34. The weather sensors 26 and GPS information is utilized to determine the current vehicle position on the roads, the contour of the approaching roads and the current weather conditions.

If the PESC module 28 detects that an unstable driving condition is likely to occur than the PESC module 28 provides at least one output signal as part of a first signal series 36 to proactively protect and provide the proper vehicle action. For example, if the vehicle 10 is travelling faster than the PESC module 28 determines is safe given the current road and weather conditions at least one output signal may be sent to the driver to slow the speed of the vehicle 10. Various output signals from the PESC module 28 may be produced simultaneously or in series to provide the desired action of the vehicle 10. In the embodiment shown, in FIG. 2 a linear series of actions is provided. One skilled in the art would be able to program the PESC module 28 to provide the actions signals to the various systems of the vehicle 10 at the desired time.

Referring to FIG. 2, the first signal series 36 is provided by the PESC module 28. In the embodiment shown, the first signal series 36 includes a first output signal, step 38, which is a driver warning signal to indicate that an unstable driving situation is likely to occur shortly. The driver warning signal may be an auditory signal, a visual signal, such as activating a warning lamp, a haptic signal, such as a steering wheel vibration, or a combination of these signals. The driver warning signal may be provided to the vehicle operator with sufficient time to allows the driver to preemptively adjust the operation of the vehicle 10 in order to avoid the unstable driving situations, such as by braking or steering the car toward an area with safer driving conditions.

If the PESC module 28 detects that further action is required a second output signal, step 40, may also be provided as part of the first signal series 36. In this embodiment, the second output signal is a signal to the steering system 16 to reduce the steering torque of the vehicle 10. The PESC module 28 may further send a third output signal, step 42, as part of the first signal series 36 to the brake system 14 to pre-charge the brakes 20 in preparation for slowing and/or stopping the vehicle 10. If further actions is required, as detected by the PESC module 28, a fourth output signal, step 44, may be sent as part of the first signal series 36 to the brake system 14 to apply the brakes 20 prior to reaching the unstable driving situation.

For example, using the PESC module 28 the PESC system 12 calculates and forecasts the proper vehicle 10 speed for the road curves, ramps, or other road contours and environmental conditions detected. In addition to informing the driver to allow the driver to adjust the vehicle 10 operation the PESC system 12 can also provide adjustment of the vehicle 10 operating conditions as illustrated by the second, third and fourth output signals of the first signal series 36.

If further action is required once the unstable driving situation has occurred the ESC system 12A may provide the required reactions from the vehicle 10 as part of a second signal series 46. The PESC system 12 and the ESC system 12A may utilize the same ECU within the PESC module 28. Following the proactive action provided by the PESC system 12, further functions performed by the vehicle 10, such as those reactions performed by the ESC, which assist in controlling the vehicle 10 may take into account the actions already applied by the PESC system 12.

While the PESC system 12 proactively prepares the vehicle 10 for a detected possible unstable driving condition the ESC system 12A reactively processes sensor data to determine that the vehicle 10 is undergoing an unstable driving situation. The PESC system 12 prepares the vehicle 10 to reduce or eliminate the unstable driving situation for the vehicle 10. Therefore, the first signal series 36 is produced by the PESC system 12 to provide a proactive action that supplies stability control and the second signal series 46 is produced by the ESC system 12A to provide a reactive response that supplies stability control for the vehicle 10. Thus, the PESC system 12 provides increased vehicle 10 safety and stability in unstable driving situations.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method of controlling stability of a vehicle comprising:
    monitoring current vehicle information with an electronic control unit for the electronic stability control system;
    monitoring a plurality of external conditions in a vehicle path of the vehicle and reporting the plurality of external conditions to the electronic control unit;
    determining an approaching unstable driving condition is likely to occur when the vehicle reaches the location of at least one of the plurality of external conditions in the vehicle path and the current vehicle information with an electronic control unit prior to the occurrence of the unstable driving condition;
    determining that under the current vehicle conditions that an intervention from the electronic stability control system will be required;
    sending a first output signal of a first signal series to activate at least one of a visual, auditory and haptic warning for a driver of the vehicle;
    sending at least a second output signal of the first signal series from the electronic control unit to at least one vehicle system to apply at least one proactive vehicle stability control action prior to the occurrence of the unstable driving condition;
    applying the at least one proactive vehicle stability control action to alter a current vehicle behavior prior to the vehicle reaching the location of the at least one of the plurality of external conditions; and
    wherein the sending the at least second output signal and the applying the at least one proactive vehicle stability control action includes:
        sending a signal to a steering system and applying the at least one proactive vehicle stability control action includes changing a steering angle of the vehicle with the steering system;
        sending a third output signal to a brake system to pre-charge at least one vehicle brake and applying the brake pre-charge with the brake system; and
        sending a fourth output signal to the brake system to apply at least one vehicle brake and applying the at least one brake with the brake system.

2. The method of claim 1, wherein the monitoring the vehicle information includes monitoring at least one of; a wheel sensor, a steering sensor and a brake sensor.

3. The method of claim 1, further comprising:
    determining at least one second vehicle stability control action when a current unstable driving condition is detected from the monitored vehicle information, wherein the at least one second vehicle stability action takes into account the at least one first stability control action;
    sending a second signal series to at least one vehicle system to apply the at least one second vehicle stability control action to correct an unstable driving condition; and
    applying the at least one second stability control action with one of a brake system and a steering system.

4. The method of claim 3, wherein the first signal series and the second signal series are sent by the electronic control unit for an electronic stability control system.

5. A method of controlling stability of a vehicle comprising:
    monitoring vehicle information with an electronic control unit for the electronic stability control system;
    monitoring a plurality of external conditions proximate to the vehicle and reporting the plurality of external conditions to the electronic control unit;
    detecting an approaching unstable driving condition is likely to occur when the vehicle reaches the location of at least one of the plurality of external conditions in the vehicle path, wherein the detecting the approaching unstable driving condition is performed with the electronic control unit based on the vehicle information and at least one of the plurality of external conditions;
    determining that under the current vehicle conditions that an intervention from the electronic stability control system will be required;

sending a signal to at least one vehicle system to apply at least one proactive vehicle stability control action prior to the occurrence of the unstable driving condition; and applying the at least one proactive vehicle stability control action to alter a current vehicle behavior prior to the vehicle reaching the location of the at least one of the plurality of external conditions;

wherein the sending the signal and applying the at least one proactive vehicle stability control action includes one of;

sending a signal to a steering system and applying the at least one proactive vehicle stability control action includes changing a steering angle of the vehicle with the steering system; and sending a signal to a brake system to pre-charge at least one vehicle brake and applying the brake pre-charge with the brake system.

6. The method of claim 5, wherein the monitoring the vehicle information includes monitoring at least one of; a wheel sensor, a steering sensor and a brake sensor.

7. The method of claim 5, wherein the detecting an approaching unstable driving condition and the sending a signal to at least one vehicle system are performed by an electronic control unit.

8. The method of claim 5, wherein the detecting an approaching unstable driving condition includes utilizing GPS and road map information to determine a current vehicle position, contour of an approaching road and current weather conditions for the approaching road.

9. The method of claim 5, wherein the sending the signal to the at least one vehicle system to apply at least one proactive vehicle stability control action includes sending a signal to activate at least one of; a visual warning, an auditory warning, a haptic warning, and a brake system action.

10. The method of claim 5, further comprising:

detecting a current unstable driving condition from the monitored vehicle information;

determining at least one second vehicle stability control action when the current unstable driving condition is detected, wherein the at least one second vehicle stability action takes into account the at least one first stability control action;

sending a second signal to apply at least one vehicle stability control reaction to correct an unstable driving condition; and applying the at least one second stability control action with one of a brake system and a steering system.

11. The method of claim 10, wherein the detecting an approaching unstable driving condition and the detecting a current unstable driving condition are performed by an electronic control unit for an electronic stability control system.

12. The method of claim 1, wherein the monitoring a plurality of external conditions proximate to the vehicle includes monitoring at least one of; a GPS system, GPS road map data and a weather sensor.

13. The method of claim 1, wherein the monitoring a plurality of external conditions further comprises monitoring external temperature, current weather conditions, and contours on an approaching road including curves and ramps.

14. The method of claim 5, wherein the monitoring a plurality of external conditions proximate to the vehicle includes monitoring at least one of; a GPS system, GPS road map data and a weather sensor.

15. The method of claim 5, wherein the monitoring a plurality of external conditions further comprises monitoring external temperature, current weather conditions, and contours on an approaching road including curves and ramps.

* * * * *